(12) United States Patent
Arakawa (10) Patent No.: US 9,891,921 B2
(45) Date of Patent: Feb. 13, 2018

(54) DATA PROCESSOR SELECTING A FLAG OUT OF A PLURALITY OF FLAGS GENERATED BY AN INSTRUCTION OPERATING ON MULTIPLE OPERAND SIZES IN PARALLEL

(71) Applicant: Renesas Electronics Corporation, Tokyo (JP)

(72) Inventor: Fumio Arakawa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 9 days.

(21) Appl. No.: 15/427,125

(22) Filed: Feb. 8, 2017

(65) Prior Publication Data

US 2017/0147350 A1 May 25, 2017

Related U.S. Application Data (60) Continuation of application No. 14/284,342, filed on May 21, 2014, now Pat. No. 9,612,838, which is a (Continued)

(30) Foreign Application Priority Data

Feb. 19, 2008 (JP) ................................. 2008-037069

(51) Int. Cl.
  *G06F 9/30* (2006.01)
  *G06F 9/38* (2018.01)
(52) U.S. Cl.
  CPC ........ *G06F 9/30185* (2013.01); *G06F 9/3016* (2013.01); *G06F 9/3865* (2013.01)
(58) Field of Classification Search
  CPC .......................... G06F 9/30094; G06F 9/30181
  See application file for complete search history.

(56) References Cited

U.S. PATENT DOCUMENTS 5,303,358 A  4/1994 Baum
5,768,574 A  6/1998 Dutton et al.
(Continued)

FOREIGN PATENT DOCUMENTS

CN  1532693 A  9/2004
EP  0 626 641 A2  11/1994
(Continued)

OTHER PUBLICATIONS

Office Action dated Feb. 20, 2014 in Japanese Patent Application No. 2013-019200.
(Continued)

*Primary Examiner* — Jacob A Petranek
(74) *Attorney, Agent, or Firm* — Shapiro, Gabor and Rosenberger, PLLC (57) ABSTRACT

The RISC data processor is based on the idea that in case that there are many flag-generating instructions, the number of flags generated by each instruction is increased so that a decrease of flag-generating instructions exceeds an increase of flag-using instructions in quantity, thereby achieving the decrease in instructions. With the data processor, an instruction for generating flags according to operands' data sizes is defined. To an instruction set handled by the RISC data processor, an instruction capable of executing an operation on operand in more than one data size, which performs a process identical to an operation process conducted on the small-size operand on low-order bits of the large-size operand, and generates flags capable of coping with the respective data sizes regardless of the data size of each operand subjected to the operation is added. Thus, the reduction in instruction code space of the RISC data processor tight in instruction code space can be achieved.

5 Claims, 4 Drawing Sheets

Related U.S. Application Data division of application No. 13/605,637, filed on Sep. 6, 2012, now Pat. No. 8,762,689, which is a division of application No. 12/369,075, filed on Feb. 11, 2009, now Pat. No. 8,402,254.

(56) References Cited

U.S. PATENT DOCUMENTS

| | | | |
|---|---|---|---|
| 5,809,306 A | 9/1998 | Suzuki et al. | |
| 5,991,868 A | 11/1999 | Kamiyama et al. | |
| 6,205,534 B1 | 3/2001 | Kamiyama et al. | |
| 7,644,255 B2 | 1/2010 | Totsuka | |
| 2003/0236965 A1* | 12/2003 | Sheaffer | G06F 9/30076 712/209 |
| 2004/0193859 A1 | 9/2004 | Okabayashi et al. | |
| 2010/0268916 A1* | 10/2010 | Hu | G06F 9/30076 712/41 |
| 2011/0035745 A1* | 2/2011 | Li | G06F 9/30174 718/1 |

FOREIGN PATENT DOCUMENTS

| | | |
|---|---|---|
| EP | 1 351 135 A2 | 10/2003 |
| JP | 6-337783 A | 12/1994 |

OTHER PUBLICATIONS

Office Action dated Nov. 8, 2012, in Japanese Patent Application No. 2008-037069.

Extended European Search Report dated Apr. 14, 2009, received in European App. No. EP 09250343.2, 7 pages.

European Examination Report dated Jun. 20, 2012, received in European App. No. EP 09250343.2, 6 pages.

"PowerPC User Instruction Set Architecture Book I Version 2.02", Jan. 28, 2005, Internet URL http://vvww.ibm.com/developerworks/power/library/pa-archguidev2.

"AMD64 Architecture Programmer's Manual vol. 1: Application Programming, Revision 3.11", Sep. 2007, Internet URL http://www.arnd.com/us-en/assets/content_type/white_papers_and_tech_docs/24592.pdf.

Office Action dated Apr. 16, 2015 for related Chinese Patent Application No. 201310187416.7.

Extended European Search Report dated Nov. 13, 2015, for European Patent Application No. 15179650.5.

Office Action dated Apr. 27, 2016, in Chinese Patent Application No. 201310187146.7.

European Search Report dated Jun. 14, 2017, in European Application No. 15179650.5.

* cited by examiner

| | | | | 15 | | | | 4 3 2 1 0 | |
|---|---|---|---|---|---|---|---|---|---|
| | | | | OPT | | | | SD | TYP |

| SD | TYP | MNEMONIC | ACTION | SD | TYP | MNEMONIC | ACTION |
|---|---|---|---|---|---|---|---|
| 00 | 000 | ANDTT | T &= newT; U:UNCHANGED | 10 | 000 | ANDTU | U &= newT; T:UNCHANGED |
| 00 | 001 | ORTT | T \|= newT; U:UNCHANGED | 10 | 001 | ORTU | U \|= newT; T:UNCHANGED |
| 00 | 010 | ANDNTT | T &=~newT; U:UNCHANGED | 10 | 010 | ANDNTU | U &=~newT; T:UNCHANGED |
| 00 | 011 | ORNTT | T \|=~newT; U:UNCHANGED | 10 | 011 | ORNTU | U \|=~newT; T:UNCHANGED |
| 00 | 100 | XORTT | T ^= newT; U:UNCHANGED | 10 | 100 | XORTU | U ^= newT; T:UNCHANGED |
| 00 | 101 | NEWTT | T = newT; U:UNCHANGED | 10 | 101 | NEWTU | U = newT; T:UNCHANGED |
| | | | | | | | |
| 01 | 000 | ANDUT | T &= newU; U:UNCHANGED | 11 | 000 | ANDUU | U &= newU; T:UNCHANGED |
| 01 | 001 | ORUT | T \|= newU; U:UNCHANGED | 11 | 001 | ORUU | U \|= newU; T:UNCHANGED |
| 01 | 010 | ANDNUT | T &=~newU; U:UNCHANGED | 11 | 010 | ANDNUU | U &=~newU; T:UNCHANGED |
| 01 | 011 | ORNUT | T \|=~newU; U:UNCHANGED | 11 | 011 | ORNUU | U \|=~newU; T:UNCHANGED |
| 01 | 100 | XORUT | T ^= newU; U:UNCHANGED | 11 | 100 | XORUU | U ^= newU; T:UNCHANGED |
| 01 | 101 | NEWUT | T = newU; U:UNCHANGED | 11 | 101 | NEWUU | U = newU; T:UNCHANGED |

```
<< C Program >>
if ((p != NULL) && (i > 10)){
...
}
<< Assembler Program >>
Step inst.
1    CMP/EQ p, 0 // U = (p == NULL)
2    ORNTU
3    CMP/GT i,10 // U = (p == NULL)|| ~(i > 10)
4    BT.D __after_if_close
```

DATA PROCESSOR SELECTING A FLAG OUT OF A PLURALITY OF FLAGS GENERATED BY AN INSTRUCTION OPERATING ON MULTIPLE OPERAND SIZES IN PARALLEL

CLAIM OF PRIORITY

The Present application claims priority from Japanese application JP 2008-037069 filed on Feb. 19, 2008, the content of which is hereby incorporated by reference into this application.

FIELD OF THE INVENTION

The present invention relates to a data processor such as a microprocessor and a microcomputer, and particularly to a technique which enables an efficient code assignment for an instruction.

BACKGROUND OF THE INVENTION

With microprocessors, 32-bit processors had been in the mainstream for a long time after development of a 68020 microprocessor by Motorola, Inc. in 1984. This is because $2^{32}$ B=4 GB, which can be designated with 32 bits, had been a sufficiently large address space over about twenty years. However, in recent years 64-bit processors, which make possible to handle a space over 4 GB, have been becoming popular in the field of PCs and servers owing to the increase in required memory capacity with the enhancement of system performance and the drop in the unit price of memories. Incidentally, it is noted that PC is an abbreviation for "personal computer". Also, it is forecasted that embedded processors will shift to 64 bits several to ten years later as if they follow the climate of the field of PCs and servers.

Unlike processors for PCs and servers, which are required to put top priority on performance, embedded processors are required to achieve both high efficiency and high performance. Consequently, embedded processors of RISC (Reduced Instruction Set Computer) type which can achieve high code efficiencies and handle instruction sets with a fixed length of 16 bits have become widespread. High code efficiencies are vital to make effective use of on-chip caches, RAMs and ROMs even in the current situation that larger capacities of off-chip memories have been achieved. However, in order to arrange such processors so as to support 64 bits, it is essential to efficiently use an instruction code space with a fixed length of 16 bits.

The 32-bit processors' age continued for a long time. In Consequence, the basis of operations has been shifted to 32 bits, and it has become common practice to extend 8- or 16-bit data to 32 bits on a register of a processor before handling, or to deal with data in sets of four 8-bit data or two 16-bit data, i.e. in 32 bits. Also, 64-bit processors are required to support an operational system based on 32 bits like this in addition to a 64-bit operational system. On this account, with regard to existing 64-bit processors, both 32-bit and 64-bit operation instructions are defined for the same operation as required. In consequence, the number of operation instructions rises as to 64-bit processors, and code spaces required for defining the operation instructions also increase.

SUMMARY OF THE INVENTION

As described above, to arrange an embedded processor of RISC type designed for an instruction code with a fixed length of 16 bits so as to cope with 64 bits, it is essential to make effective use of a code space for instructions, which is also referred to as "instruction code space" simply. Especially, 64-bit processors are required to support both 32-bit and 64-bit operational systems unlike 32-bit processors which support only 32-bit operational systems suffice, but suffice nevertheless. In case that 32-bit and 64-bit operation instructions are both defined for one operation as performed for existing 64-bit processors for meeting such requirement, an instruction set with a fixed length of 16 bits uses a considerable or excessively large part of the instruction code space, and therefore it becomes difficult to build up a 64-bit operational system comparable to an existing 32-bit operational system. For example, under the condition that there are 256 kinds of operation codes for instructions of an instruction set with a 32-bit operational system, which can be expressed with eight bits, when an attempt to add 64-bit operation instructions is made simply, it becomes necessary to increase the number of bits of the operation codes by at least one bit. As a result, the instruction code space is enlarged, and it becomes impossible to keep an existing instruction system for 32-bit operations.

Particularly, in the condition that the low-order 32 bits of a result of a 64-bit operation are the same as those of a 32-bit operation, if the flag generated from the result of the operation varies between 32-bit and 64-bit operations, it is required to define a different instruction. If only the generated flag changes, the number of instructions which generate a flag can be reduced by increasing the number of flags generated by each instruction. For example, more than one type of flags, such as Positive, Negative, Zero, Overflow and Carry, are generated with one instruction in a Power PC described in the document, "PowerPC User Instruction Set Architecture Book I Version 2.02", presented in an Internet URL hit in a search of Jan. 23, 2008.

In addition, in the case of JP-A-6-337783, more than one type of flags for more than one size is generated, and in other words, the number of generated flags is equal to "the number of types" multiplied by "the number of sizes". Specifically, in the case of JP-A-6-337783, eight flags are generated, which is the result of the calculation "4 types"×"2 sizes"="8 flags".

However, when the number of flags generated by each instruction is increased, the number of instructions which use the flags must be increased. For example, it is a common practice to decide a branch condition of a conditional branch instruction using a combination of "which flag to use" and "whether the flag to be used has been set or cleared". In a conditional branch instruction as described in JP-A-6-337783, 32 ways of using a flag can be designated because five bits are ensured as a field for that. Therefore, the number of conditional branch instructions can be determined by 32×"the number of variations of other-than-flag factors". As variations of other-than-flag factors, e.g. the presence or absence of a delay slot, and the way of designating the address of a branch destination are conceivable.

As described above, "the increase in the number of flags" contributes to "the decrease in the number of instructions which generate a flag, i.e. flag-generating instructions" on one hand; however it induces "the increase in the number of instructions which use a flag, i.e. flag-using instructions" on the other. Therefore, it is not always applicable that increasing the number of flags can reduce the number of instructions as described in JP-A-06-337783. In JP-A-06-337783, where CISC (Complicated Instruction Set Computer) is assumed, the number of operation instructions, which are main flag-generating instructions, is large because they can be used to designate a memory operand; increasing the number of flags thereby to cut flag-generating instructions, which are large in quantity, can reduce the number of instructions. In contrast, a typical RISC handles an instruction set with a fixed length of 32 bits, and has an enough instruction code space, and therefore the need for reducing the number of instructions is low. Hence, as to RISC there is not an example that the number of flags is adjusted thereby to minimize the number of instructions. However, for arranging a RISC processor designed for an instruction set with a fixed length of 16 bits so as to cope with 64 bits, enough instruction code space cannot be ensured. In addition RISC is smaller than CISC in the number of flag-generating instructions. Therefore, an optimal point cannot be found by just increasing the number of flags. It is important to arrange a system which achieves a good balance between the number of instructions which generate a flag and the number of instructions which use a flag.

The problem to be solved by the invention is to cut the number of instructions by adjusting the number of flags for an instruction set having a small number of flag-generating instructions, and to minimize the code space required for defining them, thereby to arrange a processor tight in instruction code space like RISC designed for an instruction set with a fixed length of 16 bits so as to cope with 64 bits, which makes the first object of the invention.

In general, even when the number of flags is increased, there are few cases in which two or more flags generated by one instruction are used; in many cases only one flag is used. On the other hand, using flags generated by two or more instructions in combination can make a program more efficient. However, it is difficult to use' flags in combination. This is because when two or more flags are updated each time an instruction is executed, a flag generated by the preceding instruction is overwritten by a subsequent instruction. Hence, the following are required: transferring generated flags to a register one after another and conducting a logical operation on the register to reflect the result on the flag; judging, as a numeric value, a result of a logical operation on the register to generate a flag; or carrying out a conditional branch or conditional execution each time a flag is generated. These steps increase the number of instructions to be executed, and raise the frequency of branch, and end up worsening the efficiency and deteriorating the performance.

Particularly, in case that a certain piece of data is seen as an operation target, the size of it never takes two types of values. Therefore, even if two flags are generated for two types of sizes, one of them is unnecessary. It is possible that flags for two types of sizes take an identical value owing to an appropriate sign extension or zero extension, and thus both of them can be used. However, one of them is still unnecessary. Therefore, in case that two or more flags are defined, it is effective to update only the flag which needs to be updated while leaving the rest as it is, which is desired to do so, and enable an operation between the flags, rather than update all the flags at a time. However, to actualize it, it is necessary to designate the types and locations of both of a flag updated by a flag-generating instruction and a flag used by a flag-using instruction. Hence, the largest instruction code space is needed.

The second problem to be solved by the Invention is to take advantage of more than one flag defined mainly for the purpose of minimizing the instruction code space without using a large instruction code space, thereby to make it possible to use flags generated by two or more instructions in combination, which makes the second object of the invention.

Of the matters herein disclosed, the preferred ones will be outlined below briefly.

The invention is based on an idea in the first aspect of the invention that in case that there are many flag-generating instructions, the number of flags generated by each instruction is increased so that a decrease of the number of flag-generating instructions exceeds an increase of the number of flag-using instructions, whereby the reduction in the number of instructions is realized. In the first aspect, the means of defining an instruction which generates two or more flags according to the data size of an operand is adopted. In short, with a data processor of Reduced Instruction Set Computer type, an instruction capable of executing an operation process on more than one operand different in data size, which performs a process identical to an operation process conducted on the operand of a small data size on low-order bits of the operand with a large data size, and generates flags capable of coping with the respective data sizes regardless of the data size of each operand subjected to the operation process is added to an instruction set.

In the second aspect of the invention, in order to define two or more flags, to update only the flag which needs to be updated while leaving the rest as it is, which is desired to do so, and to enable an operation between the flags, a means for designating the types and locations of both of a flag updated by a flag-generating instruction and a flag used by a flag-using instruction is adopted. That is, prefix instructions are added to an instruction set, which designate: the flag to be updated by a flag generated by a subsequent instruction, of flags corresponding to respective data sizes generated by the instructions; the flag to be used, of the flags generated by the subsequent instruction that the prefix instructions modify; and a logical operation between the two designated flags.

Now, the effects achieved by the preferred embodiments of the invention, which are disclosed herein, are as follows in brief.

According to the first aspect of the invention, the number of kinds of instructions (the number of instructions) constituting an instruction set can be reduced totally. Therefore, the invention can contribute to the reduction in the code space for instruction codes in a RISC type data processor which is tight in its instruction code space. For instance, it becomes possible to arrange a processor which is tight in its instruction code space like RISC designed for an instruction set with a fixed length of 16 bits so as to cope with 64 bits.

According to the second aspect of the invention, flags which are defined for the principal purpose of minimization of the instruction code space are utilized without using a large instruction code space, thereby making it possible to use flags generated by two or more instructions in combination.

DETAILED DESCRIPTION OF THE PREFERRED EMBODIMENTS

1. Summary of the Preferred Embodiments

The preferred embodiments of the invention herein disclosed will be outlined first. Here, the reference characters or signs to refer to the drawings, which are accompanied with paired round brackets, only exemplify what the concepts of components referred to by the characters or signs contain.

The specific descriptions on the above-described aspects will be presented first. According to the first aspect, flag-generating instructions for a RISC type 32-bit processor which handles an instruction set with a fixed length of 16 bits consist of 17 instructions having a 8-bit operand field, and 12 instructions with a 4-bit operand field e.g. in the case of a SH-4A processor core described in the document "SH-4A extended function software manual", presented in an Internet URL hit in a search of Jan. 23, 2008.

Here, an instruction update using a flag is counted as a flag-generating instruction. Now, a floating-point instruction, which has nothing to do with arrangement of a 64-bit processor, is not taken into account. On the other hand, flag-using instructions consist of 4 instructions having a n 8-bit operand field, and one instruction with a 4-bit operand field. In addition, the number of flags is one. The smaller the number of flags is, the larger the number of flag-generating instructions is, and the smaller the number of flag-using instructions is. Therefore, in the case of the SH-4A processor core, the ratio of the number of flag-generating instructions vs. the number of flag-using instructions is 29:5; the number of flag-generating instructions is about six times larger. Further, 26 instructions of the 29 flag-generating instructions are different in their ways to operate depending on the sizes of operands and as such, simply adding a 64-bit instruction increases the flag-generating instructions by 26 instructions. As a result, the ratio of the number of flag-generating instructions vs. the number of flag-using instructions is 55:5; the number of the flag-generating instructions is about 11 times larger than the number of the other instructions.

In the case that there are many flag-generating instructions like this, the number of instructions can be reduced by increasing the number of flags generated by each instruction thereby to change the ratio of the number of flag-generating instructions to the number of flag-using instructions. The possible ways of increasing the flags include: defining flags according to (1) the flag type, (2) the operand size or (3) both of them.

First, (1) the way of defining flags according to the flag type will be described. The types of flags for the SH-4A processor core include e.g. Signed Large/Signed Small, Unsigned Large/Unsigned Small, Zero, Overflow, Carry, and Shift-out Bit. Each flag is constructed of one bit, and therefore what it indicates changes depending on what instruction has put the flag. In case that different operations put different types of flags up, the number of instructions cannot be decreased by increasing the types of the flags. Therefore, when notice is taken of the case that only the flags generated in the same operation are different, a comparing instruction becomes a candidate. The number of comparing instructions can be shrunk from 18 to 8 by setting the three individual flags of Signed Large/Signed Small, Unsigned Large/Unsigned Small and Zero. As to other instructions generate the flags of Zero, Overflow, Carry, Shift-out Bit, etc., which are different in operations, the effect of reducing the number of instructions cannot be attained even when flags are classified according to flag types. On the other hand, the number of flag-using instructions is tripled according to the number of flag types, and five instructions form 15 instructions. As a result, the number of flag-related instructions is reduced from 60 by 10, and increased by 10, and therefore it remains 60.

Second, (2) the way of defining flags according to the operand size will be described. When flags are provided according to operand sizes of 32 and 64 bits, of 29 instructions differing in actions depending on operand sizes, 15 instructions which are the same in actions depending on the low-order 32 bits can be made instructions common to 32 and 64 bits. However, the size of flags is doubled, and therefore the number of flag-using instructions is changed from 5 to 10. As a result, the number of flag-related instructions is decreased from 60 by 15, and increased by 5, and therefore it is reduced to 50.

Further, (3) the way of defining flags according to both the flag type and operand size will be described. First, the number of comparing instructions can be reduced from 18 to 8 by using the three types of flags. Further, eight instructions can be decreased to four ones by defining flags according to the sizes. Further, of flag-generating instructions other than comparing instructions, the instructions which are the same in action corresponding to the low-order 32 bits can be reduced by six instructions. However, the number of flag-using instructions is sextupled according to the number of flag types, and therefore it is increased from 5 to 30. As a result, the number of flag-related instructions is decreased from 60 by 20 and increased by 25, and therefore it ends up being increased to 65.

From optimization of the number of flags in terms of minimization of the number of instructions as described above, it has become evident (2) the way of defining flags according to the operand size is the best option.

The instruction code space consumed by an instruction largely changes depending on the number of bits which the instruction uses for an operand field. In the condition that N bits are used, a space representing one $2^{(16-N)}$-th the whole instruction code space is consumed. For instance, a space of 1/256 the whole instruction code space is consumed with eight bits for an operand field, and a space of 1/4096 is consumed with four bits. On this account, it is important to reduce the number of instructions with eight bits for an operand field.

Hence, the above estimation was made on only instructions having an 8-bit operand field, which are also referred to as "8-bit operand field instructions" simply. The results are as follows. Flag-related instructions having an 8-bit operand field for a 32-bit processor consist of a total of 21 instructions, i.e. 17 flag-generating instructions and four conditional branch instructions as flag-using instructions, which add up to 21 instructions. Of the 21 instructions, 15 flag-generating instructions are different in their actions depending on the operand sizes. Therefore, when a 64-bit instruction is added simply, the number of flag-generating instructions is increased by 15 to 32, and the number of instructions is made 36 in total.

First, with (1) the way of defining flags according to the flag type, when three types of flags are defined, the number of comparing instructions can be shrunk from 17 to 6, whereas the number of conditional branch instructions is increased from 4 to 12. That is, the number of flag-related instructions is decreased from 36 by 8, and then increased by 8, and therefore it remains 36.

With (2) the way of defining flags according the operand size, of 15 instructions which are different in actions according to operand sizes, 10 instructions which are the same in action corresponding to the low-order 32 bits can be made instructions common to 32 and 64 bits. On the other hand, the number of flags is doubled, and therefore the number of conditional branch instructions is changed from four to eight. As a result, the number of flag-related instructions is decreased from 36 by 10, and then increased by 4, and therefore it ends up being reduced to 30.

Further, consideration is made for (3) the way of defining flags according to both the flag type and operand size here. First, the number of comparing instructions can be shrunk from 14 to 6 by defining three types of flags. Further, the number of comparing instructions can be decreased from six to three by defining flags according to the size. Also, of flag-generating instructions other than comparing instructions, the instructions which are the same in action corresponding to the low-order 32 bits can be reduced by three instructions. On the other hand, the number of flag-using instructions is sextupled according to the number of flag types, and therefore it is increased from 4 to 24. As a result, the number of flag-related instructions is decreased from 36 by 14, and then increased by 20, and therefore it ends up being increased to 42.

As described above, even in the case where the targets are limited to only 8-bit operand field instructions having a large influence on consumption of the instruction code space, it is the best evident (2) the way of defining flags according to the operand size is the best option. Now, it is noted that the way stated marked with (3), which has been considered to be the best as a means for minimizing the code size of an instruction in case that the three ways are applied to CISC as in JP-A-06-337783, is regarded as being the worst one to RISCs.

The first object of the invention can be achieved by defining flags according to the operand size, provided that the first object is to cut the number of instructions by adjusting the number of flags for an instruction set having a small number of flag-generating instructions, and to minimize the code space required for defining them, thereby to arrange a processor tight in instruction code space like RISC designed for an instruction set with a fixed length of 16 bits so as to cope with 64 bits. Specifically, the first object can be achieved by providing a flag for each of operand sizes of 32 and 64 bits, integrating instructions which are the same in action corresponding to the low-order 32 bits by means of an instruction with 32-bit and 64-bit operands, and increasing the number of flag-using instructions, such as conditional branches, according to increase in the number of flags. Thus, the kinds of instructions constituting an instruction set, i.e. the number of instructions, can be reduced totally.

From the second aspect of the invention, as stated in the description about the problems to be solved by the invention, in order to define two or more flags, update the flag which needs to be updated while leaving the rest as it is, and enable an operation between the flags, it is necessary to designate the types and locations of both of a flag updated by a flag-generating instruction and a flag used by a flag-using instruction, and therefore the largest instruction code space is needed.

To solve the problem, it is only necessary to define a prefix instruction, which is an instruction modifying a subsequent instruction. Implementation of a prefix instruction is similar to implementation of a variable-length instruction set. A processor which uses a prefix instruction has been used in the past as described in and after the page 87 of the document "AMD64 Architecture Programmer's Manual Volume 1: Application Programming, Revision 3.11", presented in an Internet URL hit in a search of Jan. 23, 2008. It is possible for a person skilled in the art to implement a prefix instruction. What is important is what prefix instruction is defined. In this invention, a flag-update prefix instruction includes: designating a flag to be updated; designating, of flags generated by a subsequent instruction, a flag to be used; and designating a logical operation between the flags thus designated. Assuming two types of flags and eight types of operations, the flags and logical operations can be designated with a 5-bit operand field; a large instruction code space is not needed. As a logical operation can be designated, a logical operation between flags can be executed with an instruction set, which can stop update of the flag desired to be left, and whose instructions' number agrees with that when the logical operation is performed by other instructions. Thus, the following are made possible: to take advantage of flags defined mainly for the purpose of minimizing the instruction code space without using a large instruction code space; and using, in combination, the flags generated by two or more instructions.

In consideration of the aspects, the preferred embodiments will be described here.

[1] The data processor of Reduced Instruction Set Computer type uses an instruction set including a first instruction capable of executing an operation process on operand of more than one data size, which performs a process identical to an operation process conducted on the operand of a small data size on low-order bits of the operand with a large data size, and generates flags (newU and newT) capable of coping with respective data sizes regardless of the data size of each operand subjected to the operation process. Thus, the kinds of instructions constituting an instruction set, i.e. the number of instructions, can be reduced totally. Therefore, this can contribute to reduction of the instruction code space of a data processor of RISC type which is tight in instruction code space. For example, it becomes possible to arrange a processor which is tight in instruction code space like RISC designed for an instruction set with a fixed length of 16 bits so as to cope with 64 bits.

[2] In regard to the data processor as stated in [1], the instruction set further includes a second instruction which selects and uses e.g. a flag generated by the first instruction.

[3] In regard to the data processor as stated in [1], the instruction set further includes, for example, a prefix instruction which designates, of the flags capable of coping with the respective data sizes generated by the first instruction, the flag to be updated by a flag generated by a subsequent instruction that the prefix instruction modifies. Thus, it becomes possible to update, of defined flags, only a required flag.

[4] In regard to the data processor as stated in [1], the instruction set has, for example, a prefix instruction which designates, of the flags capable of coping with the respective data sizes generated by the first instruction, the flag to be updated by a flag generated by a subsequent instruction, designates, of flags generated by the subsequent instruction that the prefix instruction modifies, the flag to be used, and designates a logical operation between the two designated flags. Thus, the following are made possible: to update, of defined flags, only a required flag leaving the flag desired to be left; and to perform an operation between the flags. Hence, flags which are defined for the principal purpose of minimization of the instruction code space are utilized without using a large instruction code space, thereby making it possible to use flags generated by two or more instructions in combination.

[5] In regard to the data processor as stated in [1], the data sizes are e.g. 32 and 64 bits.

[6] In regard to the data processor as stated in [2], the flags, for example, are Signed Large and Signed Small, Unsigned Large and Unsigned Small, Zero, Overflow, and Carry and Shift-out bit for each data size.

[7] Another data processor of Reduced Instruction Set Computer type has: an instruction-executing unit (EXU); and an instruction set having a first instruction for executing a process involving flag generation, and a second instruction for executing a process involving use of a flag. The instruction-executing unit has an operation circuit (ALU, SFT) which performs a process according to a result of decode of an instruction, a flag latch circuit (U, T), and a flag select circuit (FMUX). The operation circuit is capable of executing an operation process on more than one operand different in data size according to a result of decode of the first instruction, and performs a process identical to an operation process conducted on the operand of a small data size on low-order bits of the operand with a large data size, and generates flags capable of coping with the respective data sizes regardless of the data size of each operand subjected to the operation process. The flag latch circuit latches a flag generated by the operation circuit according to a result of decode of the first instruction. The flag select circuit selects the flag latched by the flag latch circuit, according to a result of decode of the second instruction.

[8] In regard to the data processor as stated in [7], the operation circuit, for example, generates flags of Signed Large and Signed Small, Unsigned Large and Unsigned Small, Zero, Overflow, Carry and Shift-out bit for each data size, and one of the flags thus generated is selected by the first instruction, and latched by the flag latch circuit for each operand size.

[9] In regard to the data processor as stated in [8], the data sizes are e.g. 32 and 64 bits.

[10] Another data processor includes an instruction set having an operation instruction capable of executing an operation process thereby to generate flags, and a prefix instruction which designates, of the flags generated by the operation instruction, the flag to be updated by a flag generated by a subsequent instruction, and which modifies the subsequent instruction.

[11] Still another data processor includes an instruction set having an operation instruction capable of executing an operation process thereby to generate flags, and a prefix instruction which designates, of flags generated by the operation instruction, the flag to be updated by a flag generated by a subsequent instruction, designates, of flags generated by the subsequent instruction that the prefix instruction modifies, the flag to be used, and designates a logical operation between the two designated flags.

2. Further Detailed Description of the Preferred Embodiments

Next, with reference to the drawings, the preferred embodiments will be described below further in detail. It is noted that as to all the drawings to which reference is made in describing the preferred embodiments, the members having functions identical to each other are identified by the same reference numeral, and the repeated description thereof is avoided herein.

First Embodiment

Figure 7:
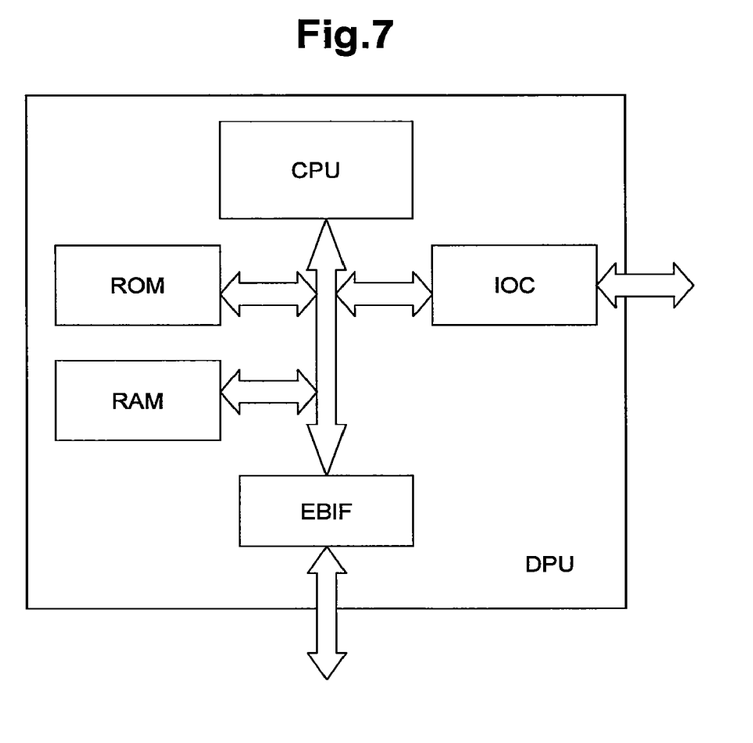
FIG. 7 is a block diagram schematically showing an example of the configuration of the data processor according to the invention.

FIG. 7 shows an example of a data processor DPU according to the invention. The data processor DPU has a processor core CPU, such as a central processing unit, and a non-volatile memory ROM connected with the processor core through an internal bus, a volatile memory RAM, an I/O interface circuit IOC, an external bus interface circuit EBIF and others, which are placed around the processor core. The data processor DPU can be formed on a semiconductor substrate made of e.g. single-crystal silicon by e.g. a complementary MOS IC manufacturing technique. The non-volatile memory ROM is used as a storage area for storing a program that the processor core CPU runs and others. The volatile memory RAM is used as a work area for the processor core CPU, and for other purpose.

Figure 1:
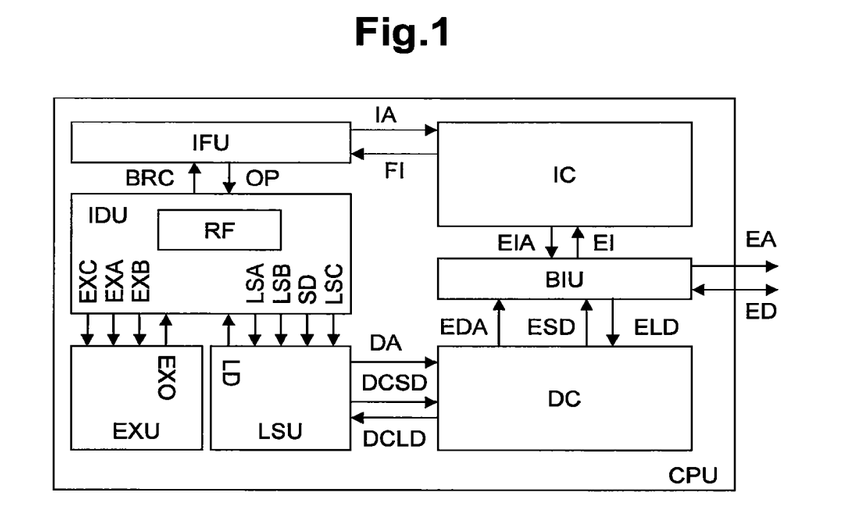
FIG. 1 is a block diagram schematically showing an example of the configuration of a processor core in a data processor according to the invention.

FIG. 1 schematically shows an example of the configuration of blocks of the processor core CPU. For example, processor core CPU includes: an instruction cache IC; an instruction fetch unit IFU; an instruction decode unit IDU; an execution unit EXU; a load/store unit LSU; a data cache DC; and a bus interface unit BIU.

The instruction fetch unit IFU outputs an instruction address IA to the instruction cache IC. Then, the instruction cache IC fetches an instruction from the address designated by the instruction address IA, and returns the fetched instruction FI to the instruction fetch unit IFU. In case of occurrence of a cache miss, the instruction cache IC outputs an address where the miss has occurred as an external instruction address EIA to the bus interface unit BIU, and receives an external fetch instruction EI and then returns the instruction FI to the instruction fetch unit IFU.

The instruction decode unit IDU receives an instruction OP from the instruction fetch unit IFU, and outputs a branch control signal BRC. Also, the instruction decode unit IDU decodes the instruction OP, and outputs an execution control information EXC and load/store control information LSC to the execution unit EXU and load/store unit LSU respectively. In parallel with this, the instruction decode unit IDU accesses a register file RF, and supplies operands EXA and EXB for execution to the execution unit EXU, and supplies address operands LSA and LSB for load and store, and store data SD to the load/store unit LSU. Further, the instruction decode unit IDU receives an execution result EXO from the execution unit EXU, and load data LD from the load/store unit LSU, and stores them in the register file RF.

The execution unit EXU receives the execution control information EXC, and operands EXA and EXB for execution from the instruction decode unit IDU, and executes an operation according to the execution control information EXC, and thereafter returns the execution result EXO to the instruction decode unit IDU.

The load/store unit LSU receives the load/store control information LSC, address operands LSA and LSB for load and store and store data SD from the instruction decode unit IDU, and executes load/store according to the load/store control information LSC, and thereafter returns load data LD to the instruction decode unit IDU. In loading/storing, the load/store unit LSU outputs a data address DA to the data cache DC. Further, the load/store unit LSU outputs data cache store data DCSD in storing. The data cache DC returns data cache load data DCLD to the load/store unit LSU in loading, whereas it stores the data cache store data DCSD therein in storing. In case of occurrence of a cache miss, the data cache DC outputs an address where the miss has occurred as an external data address EDA to the bus interface unit BIU. The data cache DC receives external load data ELD, and then returns data cache load data DCLD to the load/store unit LSU. In copy back of data in response to the occurrence of a cache miss, and storing, in place on the outside, data which has not been cached, the data cache DC outputs the data of question as external store data ESD, and in parallel outputs an address of these data as an external data address EDA.

On receipt of an external instruction address EIA/external data address EDA from the instruction cache IC/data cache DC, the bus interface unit BIU outputs an external address EA to the outside of the processor core CPU, and requests data. Then, the bus interface unit BIU receives external data ED, and outputs the data as the external fetch instruction EI/external load data ELD. Also, on receipt of the external data address EDA and the external store data ESD from the data cache DC, the bus interface unit BIU outputs them as the external address EA and the external data ED to the outside of the processor core CPU, and issues a store request.

Figure 2:
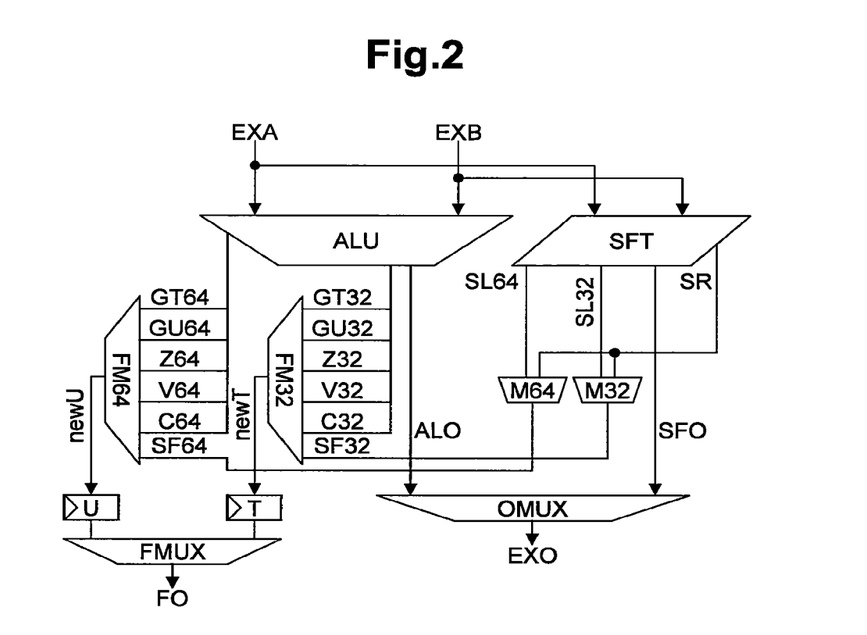
FIG. 2 is a block diagram schematically showing an example of an execution unit of a processor core according to the first embodiment of the invention.

FIG. 2 schematically shows an example of the execution unit EXU of the processor according to the first embodiment of the invention. The execution unit EXU includes: an arithmetic and logical operation unit ALU; a shifter SFT; a 32-bit flag multiplexer FM32; a 64-bit flag multiplexer FM64; a 32-bit shift-out multiplexer M32; a 64-bit shift-out bit multiplexer M64; an output multiplexer OMUX; a 32-bit operation flag T; a 64-bit operation flag U; and a flag multiplexer FMUX. Although this is not shown in the drawing, the execution control information EXC from the instruction decode unit IDU is input to the constituent parts and used to control them.

On receipt of the operands EXA and EXB for execution from the instruction decode unit IDU, the arithmetic and logical operation unit ALU executes various arithmetic logical operations according to the execution control information EXC. Thereafter, the arithmetic and logical operation unit ALU outputs an execution result ALO, a group of 32-bit flags (Signed Large GT32, Unsigned Large GU32, Zero Z32, Overflow V32 and Carry C32), and a group of 64-bit flags (Signed Large GT64, Unsigned Large GU64, Zero Z64, Overflow V64 and Carry C64).

On receipt of the operands EXA and EXB for execution from the instruction decode unit IDU, the shifter SFT executes various shift operations according to the execution control information EXC. Thereafter, the shifter SFT outputs an execution result SFO, a 32-bit left-shift-out bit SL32, a 64-bit left-shift-out bit SL64, and a right-shift-out bit SR. Then, the 32-bit shift-out bit multiplexer M32 selects the 32-bit left-shift-out bit SL32 or right-shift-out bit SR according to the direction of the shift operation, and outputs the selected left- or right-shift-out bit as a 32-bit shift-out flag SF32, which is one of the group of 32-bit flags. Also, the 64-bit shift-out bit multiplexer M64 selects the 64-bit left-shift-out bit SL64 or right-shift-out bit SR according to the direction of the shift operation, and outputs the selected left- or right-shift-out bit as a 64-bit shift-out flag SF64, which is one of the group of 64-bit flags.

The output multiplexer OMUX selects one of the execution result ALO and the execution result SFO according to the execution control information EXC, and outputs the selected one as the execution result EXO.

The 32-bit flag multiplexer FM32 selects a flag among the group of 32-bit flags according to the kind of an instruction to generate a new 32-bit flag newT, and inputs the flag to the 32-bit flag T. Likewise, the 64-bit flag multiplexer FM64 selects a flag among the group of 64-bit flags according to the kind of an instruction to generate a new 64-bit flag newU, and inputs the flag to the 64-bit flag U. The 32-bit flag T and 64-bit flag U latch the inputs, and output them to the flag multiplexer FMUX. The flag multiplexer FMUX selects one of the 32-bit flag T and 64-bit flag U according to an instruction which is to use it, and outputs the selected one as a flag output FO. The flag multiplexer FMUX uses a value after latch to select the flag which a subsequent instruction is to use. The flag multiplexer FMUX can receive control information for the subsequent instruction by use of a value before latch as the execution control information EXC from the instruction decode unit IDU, which is not shown in the drawing.

According to the first embodiment, the number of kinds of instructions (i.e. the number of instructions) constituting an instruction set can be reduced totally. Therefore, it can contribute to the reduction in the code space for instruction codes in a RISC type data processor which is tight in its instruction code space. Further, it becomes possible to arrange a processor which is tight in its instruction code space like RISC designed for an instruction set with a fixed length of 16 bits so as to cope with 64 bits.

Second Embodiment

Figure 3:
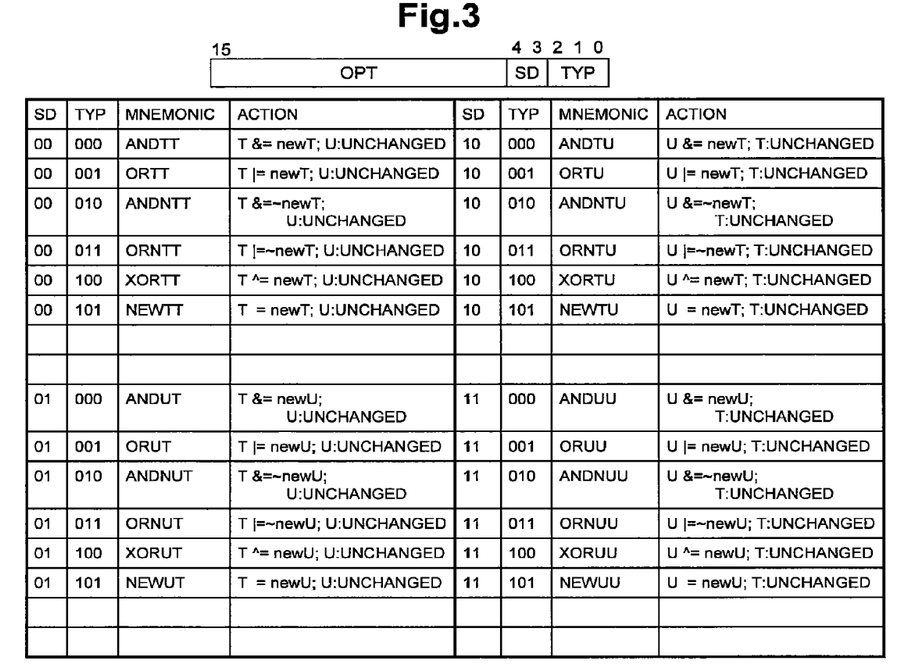
FIG. 3 is a diagram schematically showing an example of a flag-update prefix instruction according to the second embodiment of the invention.

FIG. 3 schematically shows an example of a flag-update prefix instruction according to the second embodiment of the invention. The flag-update prefix instruction designates the flag to be updated, designates, of flags generated by a subsequent instruction, the flag to be used, and designates a logical operation between two designated flags. Assuming two types of flags, i.e. the 32-bit flag T and 64-bit flag U, one bit is used to designate the flag to be updated, and another one bit is used to designate, of flags generated by a subsequent instruction, the flag to be used. Further, assuming six types of operations, three bits are used to designate a logical operation between two designated flags. Hence, a flag-update prefix instruction can designate the flags and the logical operation with five bits of operand field, which does not require a large instruction code space.

As shown in FIG. 3, when the flag-update prefix instruction is defined in the form of an instruction set with a fixed length of 16 bits, an operation type designating field OPT of 11 bits is used to indicate a flag-update prefix instruction; a source-and-destination-designating field SD of two bits is used to designate the flag to be updated and designate, of flags generated by a subsequent instruction, the flag to be used; and a logical operation-designating field TYP of three bits is used to designate a logical operation between two designated flags. There are six types of logical operations, i.e. and (AND), or (OR), invert- and (ANDN), invert- or (ORN), exclusive- or (XOR), and new-flag (NEW) operations, which are assigned 000 to 101 in TYP field respectively. Source and destination flags are added to the operation type, thereby forming a mnemonic. As to SD field, the upper bit designates a source, and the lower bit designates a destination. Specifically, zero (0) shows to designate the 32-bit flag T, and one (1) shows to designate the 64-bit flag U. In the actions' section, "newT" represents a 32-bit flag generated by a subsequent instruction, and "newU" represents a 64-bit flag generated by a subsequent instruction. Further, &=, |=, ^=, =, and ~ are operators which are the same in function as those in C language. Specifically, "&=" means to take the AND of the right-hand side value and left-hand side value, and then replace the variable of the left-hand side with the ANDed value, "|=" means to take the OR of the right-hand side value and left-hand side value, and then replace the variable of the left-hand side with the ORed value, "^=" means to take the XOR of the right-hand side value and left-hand side value, and then replace the variable of the left-hand side with the XORed value, "=" means to replace the variable of the left-hand side with the value of the right-hand side, and "~" means to logically invert the right side value.

For example, in the case where SD=00 and TYP=000, the applicable instruction is a flag-update prefix instruction characterized in the type of the logical operation is the AND, the flag to be updated (destination flag) is a 32-bit flag T, the flag to be used (source flag), which is one of flags generated by a subsequent instruction, is also a 32-bit flag T, the mnemonic is ANDTT, and the action includes, as designated by "T &=newT; U: unchanged", taking the AND of the 32-bit flag T and the 32-bit flag T, which is one of flags generated by a subsequent instruction, and storing it as the 32-bit flag T without updating the 64-bit flag U. And then, the action of the subsequent instruction is replaced with the action designated by the flag-update prefix instruction although the 32-bit flag T and 64-bit flag U would be updated with the generated flag if there was no prefix instruction.

The difference between the first and second embodiments in structure can be seen in the instruction decode unit IDU and the execution unit EXU. Therefore, the typical configuration of blocks of the processor core according to the second embodiment is shown in FIG. 1, as in the case of the first embodiment.

Figure 4:
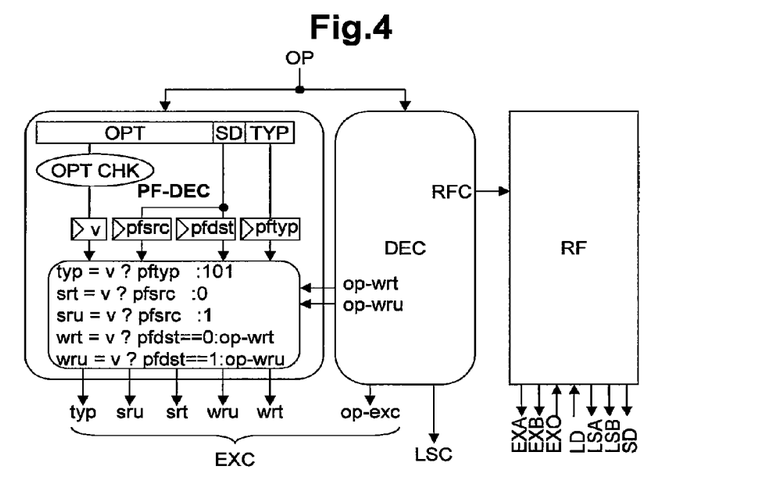
FIG. 4 is a block diagram schematically showing an example of the instruction decode unit of a processor core according to the second embodiment of the invention.

FIG. 4 schematically shows an example of the instruction decode unit IDU of the processor according to the second embodiment. The processor shown as an example in the drawing is a scalar processor which issues one instruction in each cycle. A processor which uses a prefix instruction has been used in the past as described in the document "AMD64 Architecture Programmer's Manual Volume 1: Application Programming, Revision 3.11". Therefore, it is possible for a person skilled in the art to apply the prefix decode and issue techniques according to the invention to other issue modes such as superscalar and out-of-order techniques. It is assumed in this embodiment that only the flag-update prefix instruction is a prefix instruction. However, it is also possible for a person skilled in the art to extend the processor so that it can handle another prefix instruction additionally.

The instruction decode unit IDU includes a main decoder DEC and a prefix decoder PF-DEC. The main decoder DEC decodes an instruction OP supplied from the instruction fetch unit IFU, and outputs an execution control information op-exc to the execution unit EXU as a part of the execution control information EXC, update control information op-wrt for a 32-bit flag and update control information op-wru for the 64-bit flag U to the prefix decoder PF-DEC, load/store control information LSC to the load/store unit LSU, and register-file control information RFC to the register file RF. Incidentally, of the register-file control information RFC, write information is supplied in keeping with the timing that an issued instruction reaches a register write stage.

Based on the register-file control information RFC, the register file RF supplies operands EXA and EXB for execution to the execution unit EXU, and address operands LSA and LSB for load and store and store data SD to the load/store unit LSU. Further, the instruction decode unit IDU receives an execution result EXO from the execution unit EXU, and accepts load data LD from the load/store unit LSU, and stores them in the register file RF.

The prefix decoder PF-DEC decodes the content of the operation type designating field OPT of the instruction OP. The prefix decoder PF-DEC sets a valid flag v if the instruction OP is a flag-update prefix, or otherwise clears it. The prefix decoder PF-DEC latches two bits of source-and-destination field SD as prefix source-flag information pfsrc and prefix destination-flag information pfdst respectively. Further, the prefix decoder PF-DEC latches the content of the logical-operation-designating field TYP as prefix logical-operation-designating information pftyp. If the instruction OP is a flag-update prefix instruction, it is also supplied to the main decoder DEC. At that time, the main decoder DEC regards the flag-update prefix as a no-operation code, and outputs control information, by which the execution unit EXU and load/store unit LSU do nothing.

In the cycle subsequent to a cycle in which the instruction OP is a flag-update prefix instruction, the main decoder DEC decodes the subsequent instruction, and outputs the various control information as described above. On the other hand, the prefix decoder PF-DEC goes ahead with the process steps using the information latched in the preceding cycle. As the instruction OP was a flag-update prefix instruction in the preceding cycle, the valid flag v remains set in this cycle. Therefore, the following are output as logical-operation-designating information typ, 32-bit flag source information srt, 64-bit flag source information sru, 32-bit flag update control information wrt, and 64-bit flag update control information wru respectively: prefix logical-operation-designating information pftyp; prefix flag-source-designating information pfsrc; prefix flag-source information pfsrc, which is identical to the preceding information; and equivalence of prefix destination-flag information pfdst and zero (0); and equivalence of prefix destination-flag information pfdst and one (1). As a result, the 32-bit flag update control information op-wrt and 64-bit flag update control information op-wru from the main decoder are overwritten as control information for flag generation, and then information of the flag-update prefix instruction is output.

In contrast, in the cycle subsequent to a cycle in which the instruction OP is not a flag-update prefix instruction, the valid flag v has not been set. Therefore, output as the logical-operation-designating information typ, 32-bit flag source information srt, 64-bit flag source information sru, 32-bit flag update control information wrt, and 64-bit flag update control information wru are 101, 0, 1, the 32-bit flag update control information op-wrt, and the 64-bit flag update control information op-wru respectively. As a result, the output of the main decoder DEC is put outside as an output of the instruction decode unit IDU. Now, it is noted that the default action of the instruction is specified by outputting 101, 0 and 1 as the logical-operation-designating information typ, 32-bit flag source information srt, and 64-bit flag source information sru, respectively without any corresponding outputs from the main decoder DEC.

The logical-operation-designating information typ, 32-bit flag source information srt, 64-bit flag source information sru, 32-bit flag update control information wrt, and 64-bit flag update control information wru, and the execution control information op-exc generated by the main decoder DEC are output to the execution unit EXU as the execution control information EXC.

Figure 5:
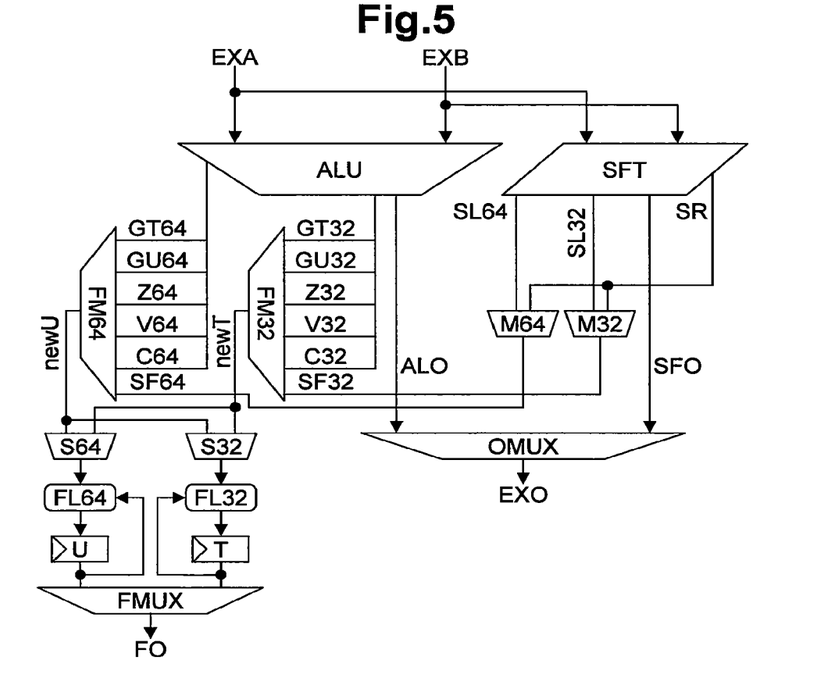
FIG. 5 is a block diagram schematically showing an example of the execution unit of the processor core according to the second embodiment of the invention.

FIG. 5 schematically shows an example of the execution unit EXU of the processor according to the second embodiment. The like parts, which are common between the execution units EXU according to the first and second embodiments, shall have the same functions as those of the execution unit according to the first embodiment shown in FIG. 2. The parts added according to the second embodiment are a 32-bit flag source multiplexer S32, a 64-bit flag source multiplexer S64, a 32-bit flag logical operation unit FL32, and a 64-bit flag logical operation unit FL64.

The 32-bit flag source multiplexer S32 selects one of the new 32-bit flag newT and new 64-bit flag newU according to the 32-bit flag source information srt from the instruction decode unit IDU, and supplies the selected one to the 32-bit flag logical operation unit FL32. The 32-bit flag logical operation unit FL32 performs a logical operation with the 32-bit flag T and the one selected from among the new 32-bit flag newT and new 64-bit flag newU, according to the logical-operation-designating information typ. The result is made a new value latched by the 32-bit flag T. Likewise, the 64-bit flag source multiplexer S64 selects one of the new 32-bit flag newT and new 64-bit flag newU according to the 64-bit flag source information sru from the instruction decode unit IDU, and supplies the selected one to the 64-bit flag logical operation unit FL64. The 64-bit flag logical operation unit FL64 performs a logical operation with the 64-bit flag U and the one selected from among the new 32-bit flag newT and new 64-bit flag newU, according to the logical-operation-designating information typ. The result is made a new value latched by the 64-bit flag U.

As described above, the instruction decode unit IDU and execution unit EXU according to the second embodiment make possible using a flag-update prefix instruction which does not need a large instruction code space: to stop update of the flag desired to be unchanged; and to conduct a logical operation between flags generated by two or more instructions.

Figure 6:
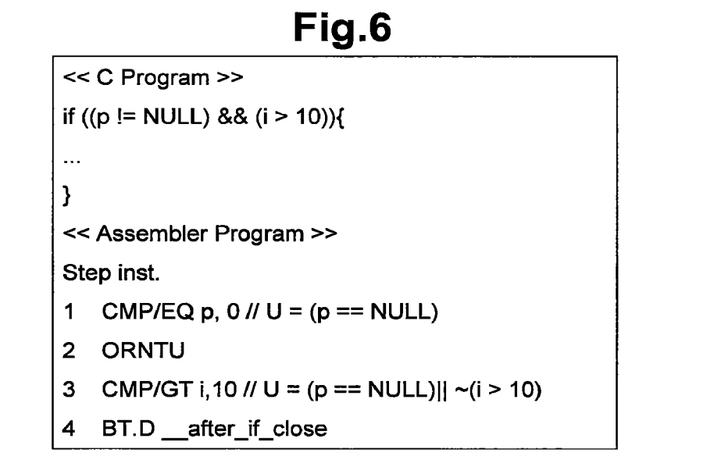
FIG. 6 is a diagram schematically showing an example of an action of the processor core according to the second embodiment of the invention.

Next, the effect of the flag-update prefix instruction will be described based on a concrete example. FIG. 6 schematically shows an example of an action of the processor according to the second embodiment. In the C program of FIG. 6, if a 64-bit pointer p is not NULL pointer and a 32-bit variable i is larger than 10, then the instruction written between parentheses is executed. NULL pointer designates nothing, and the value is zero (0).

If this C program is written with an assembler including a flag-update prefix instruction, it can be written with four instructions as shown in FIG. 6. In the first step, the value of the 64-bit pointer p is compared with NULL pointer's value 0 in 64-bit size according to the instruction CMP/EQ p, 0, and the result of the comparison is stored in the 64-bit flag U. If the 64-bit pointer p is NULL pointer, the 64-bit flag U is put up, i.e. U=(p==NULL). At that time, the result of comparison of the value of the 64-bit pointer p with NULL pointer's value 0 in the low-order 32 bits is stored in the 32-bit flag T, which is not used in this program. In the second step, the flag-update prefix instruction ORNTU is decoded. In the third step, if the 32-bit variable i is larger than 10, then the new 32-bit flag newT is set, according to the instruction CMP/GT i,10. Further, U|=~newT according to the flag-update prefix instruction ORNTU, and therefore, U=(p==NULL)|~(i>10). In this time, the 32-bit flag T is unchanged. As a result, the reversal value of the conditional expression of IF statement of the C program is placed in the 64-bit flag U. In the fourth step, if U=1, i.e. the conditional expression is not met, the processor jumps to the line just after IF statement, according to the instruction BT.D_after_if_close, and therefore IF statement is not executed.

As described above, more than one comparison result can be pieced together by using a flag-update prefix instruction, and therefore judgment of a condition is completed by one conditional branch. In case that no flag-update prefix instruction is used, a conditional branch needs to be conducted each time of judgment of a condition, which is hard to speed up. Alternatively, the following procedure is carried out in case that a generated flag is transferred to a general-purpose register and then a logical operation is performed: a flag transfer instruction MOVU R0 is executed instead of the flag-update prefix instruction of the second step thereby to transfer the generated U flag to the general-purpose register R1; and a flag transfer instruction MOVT R0 is executed thereby to transfer the generated T flag to the general-purpose register R1 before the conditional branch of the fourth step; logical reversal is performed by NOT R0; high-order bits are cleared by AND #1,R0; and (p==NULL)|~(i>10) is generated by OR R0,R1. Further, (p==NULL)|~(i>10) is stored in the 32-bit flag T by SHLR R1. Thus, the number of instructions is increased by four, i.e. doubled, resulting in the deterioration in performance. The flag-update prefix instruction can accelerate complicated condition judgments.

Although invention made by the inventor has been concretely described above based on the embodiments, it is not limited to the embodiments. It is needless to say that various changes and modifications may be made without departing from the subject matter hereof. For example, the flag-update prefix instructions, as typified by ORNTU, have the function of designating the flag to be updated by a flag generated by the subsequent instruction, the function of designating the flag to be used of flags generated by the subsequent instruction, and the function of designating a logical operation between two designated flags. However, the invention is not limited to such example. The flag-update prefix instruction may be an instruction having only the function of designating, of flags corresponding to the data sizes generated previously, the flag to be updated by a flag generated by the subsequent instruction.

What is claimed is:

1. A data processor of Reduced Instruction Set Computer type, comprising an instruction-execution unit configured to execute instructions of an instruction set,
  wherein the instructions include a first instruction which causes the instruction-execution unit to execute a process involving flag generation, and a second instruction which causes the instruction-execution unit to execute a process involving use of a flag,
  wherein the instruction-execution unit comprises:
    an operation circuit operable to perform a process according to a result of a decode of an instruction;
    a first flag select circuit;
    a second flag select circuit;
    a first flag latch circuit;
    a second flag latch circuit; and
    a third flag select circuit,
  wherein the operation circuit, which is capable of performing on operands in more than one data size according to a result of a decode of the first instruction, is configured to perform an identical process on low-order bits of a large data size operand and on a small data size operand, and generate a first flag group corresponding to the large data size operand and a second flag group corresponding to the small data size operand,
  wherein the first flag select circuit is configured to select a first flag out of the first flag group according to a result of the decode of the first instruction,
  wherein the second flag select circuit is configured to select a second flag out of the second flag group according to a result of the decode of the first instruction,
  wherein the first flag latch circuit is configured to latch the first flag,
  wherein the second flag latch circuit is configured to latch the second flag, wherein the third flag select circuit is configured to select one among the first flag latched by the first flag latch circuit and the second flag latched by the second flag latch circuit.

2. The data processor according to claim 1,
wherein the instruction set has a prefix instruction which modifies a subsequent instruction, and
wherein the modification includes designating a flag among the first flag and the second flag to be updated by a flag generated by the subsequent instruction.

3. The data processor according to claim 1,
wherein the instruction set has a prefix instruction which modifies a subsequent instruction,
wherein the modification includes:
  designating a flag among the first flag and the second flag to be updated by a flag generated by the subsequent instruction,
  designating another flag among flags generated by the subsequent instruction to be used, and
  designating a logical operation between the two designated flags.

4. The data processor according to claim 1,
wherein the small data size is 32 bits and the large data size is 64 bits.

5. The data processor according to claim 1,
wherein the first and second flag groups include flags of Signed Large and Signed Small, Unsigned Large and Unsigned Small, Zero, Overflow, Carry and Shift-out bit for each data size.

\* \* \* \* \*